(12) United States Patent
Lindblom

(10) Patent No.: US 10,173,837 B2
(45) Date of Patent: Jan. 8, 2019

(54) MULTI-STOREY GOODS STORAGE ARRANGEMENT

(71) Applicant: LOGEVO AB, Älmhult (SE)

(72) Inventor: Bo Lindblom, Osby (SE)

(73) Assignee: LOGEVO AB, Almhult (SE)

(*) Notice: Subject to any disclaimer, the term of this patent is extended or adjusted under 35 U.S.C. 154(b) by 162 days.

(21) Appl. No.: 15/115,141

(22) PCT Filed: Jan. 15, 2015

(86) PCT No.: PCT/SE2015/050029
§ 371 (c)(1),
(2) Date: Jul. 28, 2016

(87) PCT Pub. No.: WO2015/115965
PCT Pub. Date: Aug. 6, 2015

(65) Prior Publication Data
US 2016/0340122 A1    Nov. 24, 2016

(30) Foreign Application Priority Data

Jan. 31, 2014    (SE) ...................................... 1450109

(51) Int. Cl.
*B65G 1/04* (2006.01)
*G06Q 10/08* (2012.01)

(52) U.S. Cl.
CPC ......... *B65G 1/0414* (2013.01); *B65G 1/0464* (2013.01); *G06Q 10/087* (2013.01); *G05B 2219/50388* (2013.01)

(58) Field of Classification Search
CPC .. B65G 1/0414; B65G 1/0464; B65G 1/0492; B65G 1/065; B65G 47/91; B65G 1/0457;
(Continued)

(56) References Cited

U.S. PATENT DOCUMENTS 3,089,598 A * 5/1963 Temple .................... B65G 7/08
                                                414/758
3,817,406 A * 6/1974 Sawada ................ B65G 1/0414
                                                414/273
(Continued)

FOREIGN PATENT DOCUMENTS

DE    43 16 338 A1    11/1994
EP    2 657 155 A1    10/2013
(Continued)

OTHER PUBLICATIONS

International Search Report and Written Opinion dated Jul. 14, 2015 for corresponding application No. PCT/SE2015/050029.

*Primary Examiner* — Glenn F Myers
(74) *Attorney, Agent, or Firm* — Renner Otto Boisselle and Sklar

(57) ABSTRACT

A multi-story goods storage arrangement comprising a plurality of levels of storage lines arranged in parallel and transport lines extending between opposing ends of said storage lines, wherein a transfer cart is operable along each transport line. It further comprises a top shuttle suspending from top rail arrangement on said transfer cart and moveable out from said transfer cart into a suspension rail arrangement in said storage lines, and lifting means arranged on said top shuttle to lift goods stored in said storage lines and to transport lifted goods to the transfer cart.

10 Claims, 3 Drawing Sheets

(58) Field of Classification Search
CPC ..... B60P 1/6409; B60P 1/6436; B60P 1/6472; B60P 1/6418; H01L 21/67733
USPC .......................... 414/758, 279, 498, 282, 284
See application file for complete search history.

(56) References Cited

U.S. PATENT DOCUMENTS

| | | | | |
|---|---|---|---|---|
| 3,827,365 A | * | 8/1974 | Coppel | B65G 1/0414 104/88.03 |
| 3,866,767 A | * | 2/1975 | Zollinger | B65G 1/0414 414/279 |
| 4,236,255 A | * | 11/1980 | Burgener | B65G 1/0414 180/167 |
| 4,273,494 A | * | 6/1981 | Swain | B65G 1/0414 414/266 |

FOREIGN PATENT DOCUMENTS

| | | |
|---|---|---|
| EP | 2 657 156 A1 | 10/2013 |
| JP | S51 4774 A | 1/1976 |
| JP | S51 68180 U | 5/1976 |
| JP | S52 171091 U | 12/1977 |
| JP | S53 160190 U | 12/1978 |
| JP | S57 99813 U | 6/1982 |
| JP | H01 203105 A | 8/1989 |
| WO | 2013/167907 A1 | 11/2013 |

\* cited by examiner

MULTI-STOREY GOODS STORAGE ARRANGEMENT

This application is a national phase of International Application No. PCT/SE2015/050029 filed Jan. 15, 2015 and published in the English language.

TECHNICAL FIELD

A multi-story goods storage arrangement comprising a plurality of levels of storage lines arranged in parallel and transport lines extending between opposing ends of said storage lines, wherein a transfer cart is operable along each transport line.

PRIOR ART

Multi-story goods storage arrangements or pallet racks are used in a wide area of applications, such as conventional warehouses, storages and stores. Goods, such as packages or cases, are normally arranged on pallets that are transported in the multi-story goods storage arrangement by different kinds of carts, carriages, shuttles and conveyors. In automated multi-story goods storage arrangements the carriages, shuttles and conveyors are controlled by computer systems and pick up, transport, store and deliver goods without human influence.

U.S. Pat. No. 6,149,366 discloses a cellular depot including a plurality of cells facing onto a corridor through which runs at least one motor-driven car to convey loads between the cells. The car includes a trolley which is motor-driven to move between the car and the inside of a cell and transfer a load stored or to be stored to and from the car and cell. The trolley includes a hydraulic drive means connected, for their power supply, to an independent source of fluid under pressure, which is automatically recharged when the trolley is accommodated on the car. The hydraulic drive means is used to obviate problems related to electric accumulators, such as replacement requirements and risk of emission of gas when recharging. U.S. Pat. No. 3,978,995 discloses warehousing system comprises an array of storage bins arranged in vertical tiers with the tiers arranged in rows having access aisles extending along the rows. The self-powered mobile transfer vehicle includes forks for transferring loads between the vehicle and a storage bin. At least one of the transfer vehicles in the system is a tier picking vehicle including a vacuum operated picking head mounted to be lowered and raised between the picking vehicle and a make-up transfer vehicle below the picking vehicle. Tiers of articles picked directly from a palletized load in a storage location can be transferred to the make-up transfer vehicle.

In some multi-story goods storage arrangements manual picking from pallets on a picking line is used to combine different objects from different pallets into mixed pallets for delivery or packaging. Pallets with selected goods may be collected automatically from the multi-story goods storage arrangement to a picking line. A mixed pallet is then manually put together and the collected pallets with remaining goods are again dispatched automatically in the multi-story goods storage arrangement.

SUMMARY OF THE INVENTION

It would be desirable to improve the process in prior art multi-story goods storage arrangements of putting together a mixed pallet of different items or goods. In accordance with the invention the multi-story goods storage arrangement is automated and the carriages, shuttles and conveyors are controlled by computer systems to pick up, transport, store and deliver goods without human influence. The multi-story goods storage arrangement comprises a plurality of levels of storage lines arranged in parallel and transport lines extending between opposing ends of sets of said storage lines. In accordance with the invention suspended shuttles are used to pick up automatically items from selected pallets stored in said storage lines and to place automatically the items on a second pallet forming a mixed pallet. Shuttles are operated automatically to transport pallets between selected positions in said storage lines and transfer carts operable along said transport lines. In various embodiments the shuttles are propelled by electric motors and are battery powered. The electrical motors can be arranged to generate electrical power during braking of the shuttle.

The mixed pallet then can be dispatched from the multi-story goods storage arrangement while the each pallet from which items have been picked up automatically are returned to the multi-story goods storage arrangement. The mixed pallet can be supported on a transfer cart when it is put together or being supported at a selected position in a storing line.

In various embodiments at least one goods elevator is arranged to transport goods in a vertical direction between different levels of storage lines. A transfer cart supporting at least one shuttle is operable along each transport line. Each shuttle is self-operated and arranged to run along rails in the storage lines to move goods between the transfer cart and different positions in the storage lines. The shuttles are provided with vision sensors and/or other detectors that obtain information used by the regarding the present position of the shuttle. The information can be used by an on-board computer on the shuttle during movements. In various embodiments the storage lines are provided with markers or other position indicating means that are read by the vision sensors and/or other detectors on the shuttle and then used for positioning the shuttle correctly.

Each pallet received for storing in the multi-story goods storage arrangement normally supports one kind of goods or packets and can be referred to as purchasing pallets. The goods can be stored in different patterns on a pallet and in one or a plurality of tiers or layers. A pallet received into multi-story goods storage arrangement is examined and the pattern formed by goods or packet for each type of purchasing pallet is stored in a control system. In various embodiments at least two image recorders or cameras are used to provide a 3D image of the received pallet. The information stored will be used later on when single items on a received pallet are lifted and picked up by a top shuttle.

The goods or items on purchasing pallets preferably should be moved to a base plate so as to be safely supported and moved in the story goods storage arrangement. Before examining the content of a purchasing pallet, packing or wrapping is removed. In various embodiments the base plate is arranged on top of the goods on the purchasing pallet and the complete pallet is turned upside down. The purchasing pallet now on top of the goods then can be removed and the goods are supported on the base plate.

BRIEF DESCRIPTION OF THE DRAWINGS

In order that the manner in which the above recited and other advantages and objects of the invention are obtained will be readily understood, a more particular description of the invention briefly described above will be rendered by reference to specific embodiments thereof which are illustrated in the appended drawings.

Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
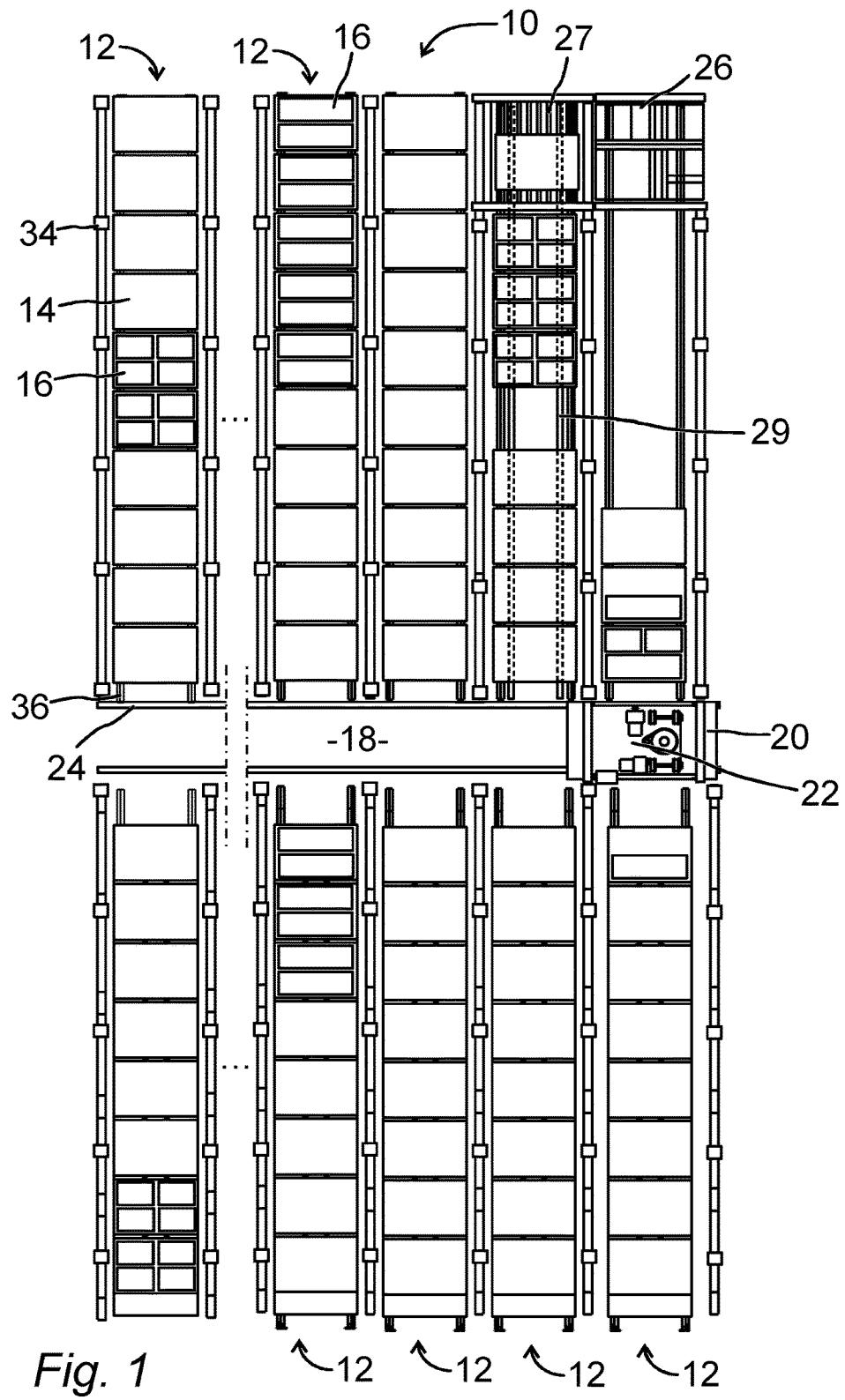
FIG. 1 is a schematic top view of a first embodiment of a multi-story goods storage arrangement in accordance with the invention.
Figure 6:
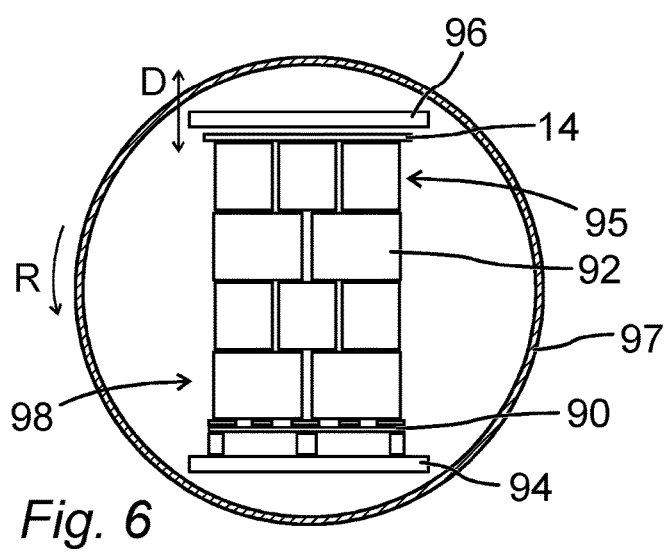
FIG. 6 is a schematic side view of a purchase pallet arranged for removal of the pallet.

In the embodiment shown in FIG. 1 a multi-story goods storage arrangement or pallet racking 10 comprises a plurality of levels of storage lines 12 in which pallets 14 with goods 16 are stored. The pallets 14 can be formed as base plates that are well suited for transporting and storing in the storage lines, c.f. FIG. 6 and corresponding description below. A base plate also has a lower height which will increase the capacity of the storage arrangement. The storage lines 12 extend in two opposite directions from a transport line 18 extending between opposite ends of said storage lines 12, said transport line 18 also having a plurality of levels. On each level of the transport line 18 a transfer cart 20 supporting a shuttle 22 operates in a direction perpendicular to the storage lines 12. The transfer carts 20 run on rails 24. The shuttle 22 is supported in a conventional way on a rail system in a lower section of the transfer cart 20. A corresponding rail system extends along said storage lines 12 to allow said shuttle 22 to transport pallets 14 to and from selected positions along said storage lines 12.

Figure 2:
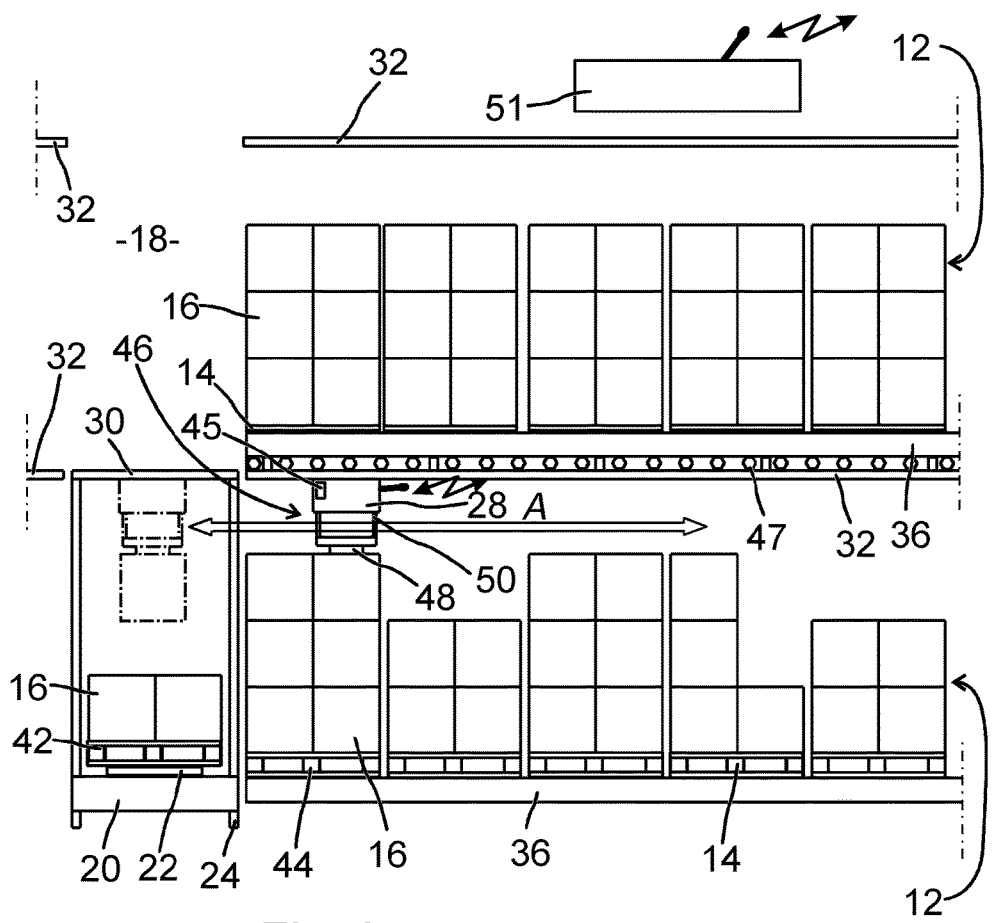
FIG. 2 is a schematic side view of an embodiment of a multi-story goods storage arrangement in accordance with the invention.

At a storage line or at an extension of a storage line an elevator 26 is arranged to transport goods in a vertical direction. It should be noted that a plurality of storage lines 12 are arranged at each level along said transport line 18, c.f. FIG. 2. Normally each pallet in storage lines 12 supports one type of articles or goods. Goods normally are received to and delivered from the multi-story goods storage arrangement via the elevator 26. Goods can be transported from the elevator to a storage line by a conveyor, such as an input roller conveyor 27. The input roller conveyor 27 can be used also to transport pallets in the reverse direction to the elevator 26. A chain conveyor 29 can be arranged for transporting pallets along a specific storage line.

Each shuttle 22 is arranged to move away from the transfer cart 20 into said storage lines 12 carrying goods 16. The pallets 14 can be transported along a storage line 12 to be placed at a selected position in the storage line 12. The pallets 14 also can be picked up at a selected position by the shuttle 22 and transported to the transfer cart 20 which then will transport the picked up pallet along the transport line to a selected new storage line.

The multi-story goods storage arrangement basically is a pallet racking with a plurality of uprights 34 and horizontal load beams 36. The load beams 36 can be designed as or include said rail system for supporting the shuttle 22. Conventional diagonal braces and horizontal braces can also be used.

The front view of one level of one embodiment of a multi-story goods storage arrangement in accordance with the invention of FIG. 2 shows two levels of storage lines 12 in which a plurality of pallets 14 with goods 16 are stored. A transfer cart 20 shown on a lower level operates in a transport line 18 (into and out of the plane of paper shown in FIG. 2) and supports a shuttle 22. At least one transfer cart 20 operates along a transport line 18 at each level.

The shuttle 22 moves from the transfer cart 20 into the storage lines 12 and back carrying pallets 14 with or without goods 16. The shuttle 22 is provided with support means that can be raised in position under a pallet 14 and kept in a raised position during transport in the storage line 12. When goods have reached an intended position in the storage line or elsewhere the support means is lowered and the goods will rest on rails or load beams 36 or on the transfer cart 20.

The transfer cart 20 also carries a top shuttle 28 suspended from a top rail arrangement 30 and movable into and out of a suspension rail arrangement 32 in the storage lines 12 as indicated by arrow A. A picking pallet 42 is arranged on the transfer cart 20 and boxes and goods are collected by the top shuttle 28 in the storage lines 12 and placed on the picking pallet 42. When the picking pallet 42 is completed with a desired set of goods a ready pallet 44 is formed. The ready pallet 44 is transported by the shuttle 22 to a selected position in a storage line 12. A completed picking pallet 42, referred to as the ready pallet 44, can be transported further down to the elevator 26. The ready pallet 44 normally carries different goods or articles combined for delivery to a customer. If required further goods or articles can be added to the picking pallet from other levels to complete a ready pallet 44. In various embodiments also the picking pallets 42 and thus the ready pallets are formed as base plates.

Figure 3:
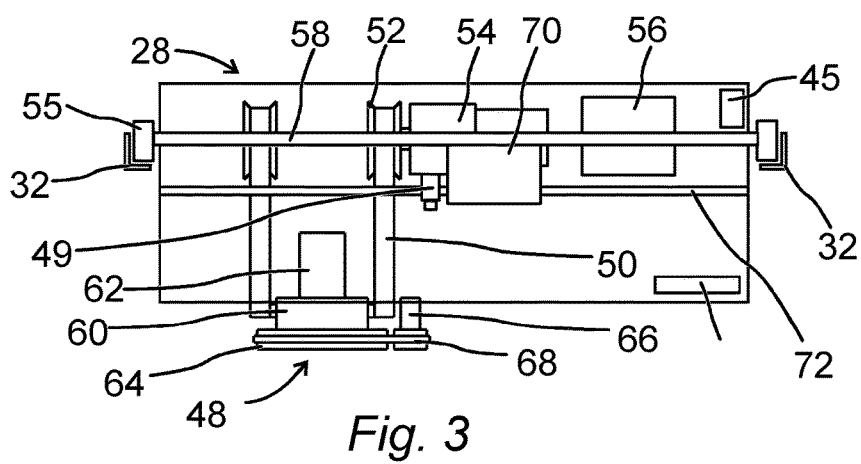
FIG. 3 is a schematic side view of a top shuttle used in the multi-story goods storage arrangement shown in FIG. 2.
Figure 4:
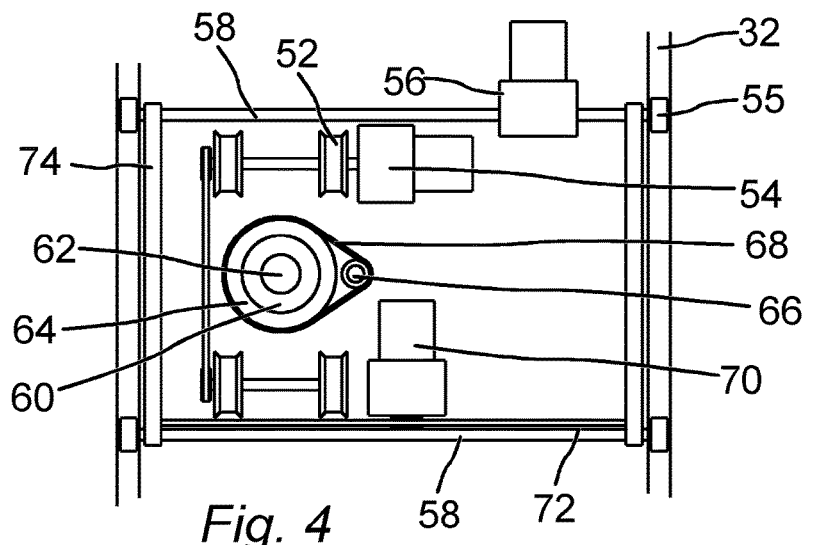
FIG. 4 is a schematic top view of the top shuttle shown in FIG. 3.

In various embodiments the top shuttle 28 comprises lifting means 46 for lifting goods on pallets in the storage lines 12. The lifting means 46 is designed in dependence on the type of goods or boxes that are stored in the storage lines 12. In the embodiment shown in FIG. 2 the lifting means 46 comprises a lifting yoke 48 suspended in hoisting belts 50, c.f. FIG. 3 and FIG. 4. Normally the top shuttle 28 is supported in the top rail arrangement 30 when the transfer cart 20 moves along a transport line 18. When all goods on a pallet 14 have been removed the top shuttle 28 picks it up and outputs it together with the ready pallet 44.

The top shuttle 28 also is provided with vision sensors and/or other detectors that obtain information regarding the present position of the top shuttle. The information can be used by a processing unit such as an onboard computer on the top shuttle 28 during movements and for positioning the lifting means 46 correctly over an item to be picked up. In various embodiments the shuttles 22, 28 are provided with sensor means 45 and a counter. The sensors sense pulses generated when the shuttles pass by markers 47 arranged at fixed distances in storage lines 12. By counting said pulses the counter and the on-board computer can determine the present position of the shuttle. The sensor means 45 and markers 47 can operate mechanically, magnetically or optically. Markers 47 can be apertures formed in the horizontal load beams 36 and in the suspension rail arrangement 32.

In various embodiments the markers 47 carries positional data readable by the sensor means 45 to allow the on-board computer to directly determine the position of the top shuttle 28. A vision sensor or camera 49 is arranged on the top shuttle 28 to provide images of the goods and to facilitate the positioning of the lifting yoke 48 correctly over the goods. The conventional shuttles 22 as well as the top shuttles 28 are operatively connected to a control system 51, preferably through a wireless communication link, such as a wireless local area network. In various embodiments optical wireless communications (OWC) including medium range OWC, are used. In embodiments where shuttles 22 are powered by electric power lines the power lines can be used for signalling instead or as well.

In the embodiment of a top shuttle 28 shown in FIG. 3 and FIG. 4 the lifting means 46 comprises a lifting yoke 48 suspended in hoisting belts 50. The hoisting belts are suspended from hoisting wheels 52 driven by a motor and gearbox 54. The top shuttle 28 supported on support wheels 55 moves along the storage lines 12 on the suspension rail arrangement 32 driven by a shuttle motor 56 including a gearbox. The support wheels 55 are arranged on two wheel shafts 58.

The lifting yoke 48 comprises a fan such as a suction device 60 driven by a suction motor 62. The lifting yoke 48 preferably is arranged to rotate goods that have been lifted before being positioned on a picking pallet 42. In the embodiment shown in FIG. 3 a rotation rim 64 is connected to a rotation motor 66 by a belt 68. The lifting yoke 48 is moved in a direction perpendicular to the direction of the storage lines 12 by a yoke motor 70 and a transfer means 72 such as a chain. The wheel shafts 58 can be driven together, for instance by being connected by a transfer belt 74.

Figure 5:
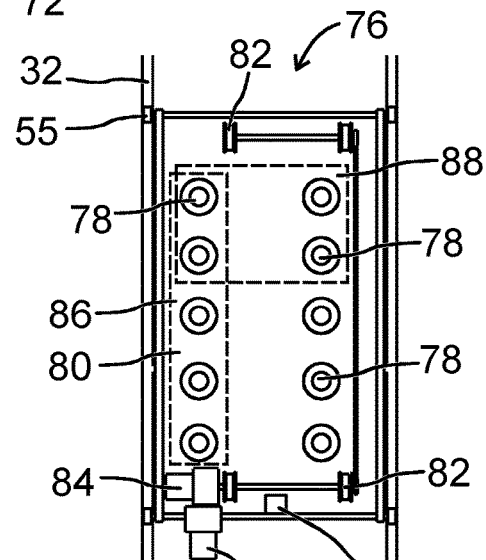
FIG. 5 is a schematic top view of an alternative embodiment of a top shuttle used in the multi-story goods storage arrangement shown in FIG. 2.

An alternative embodiment of a top shuttle 76 is shown in FIG. 5. It moves along a storage line on support wheels 55 on a suspension rail arrangement 32 as described above. A lifting yoke 80 is suspended on hoisting belts (not shown) on hoisting wheels 82 driven by a hoist motor 84. The top shuttle 76 is driven by a shuttle motor 56.

Instead of one suction device as described above a plurality of distributed suction devices 78 are used. Different subsets of the distributed suction devices 78, such as a first subset 86 comprising all suction devices in a row, or a second subset 88 comprising four top suction devices, can be engaged by a control system in dependence of different pattern of goods on the pallets. The alternative top shuttle 76 is also provided with a camera 49.

The multi-story goods storage arrangement in accordance with the invention handles pallets with different sets and different types of boxes and goods. When cardboard are used in the boxes the lifting means with suction devices described above can be used. If other types of boxes are used the lifting means comprises conventional mechanical lifting devices.

One or more top shuttles 28 can be associated and used with each transfer cart 20. The top shuttles 28 can be battery powered or powered from the associated transfer cart 20.

In FIG. 6 a received purchase pallet 90 supporting a plurality of identical items 92 has been moved to a horizontally extending first conveyor 94. All wrapping has been removed. Purchase pallets 90 can be of different shapes and conditions and preferably should not be used in the storage lines. Therefore a pallet 14 formed as a base plate is placed on top of a top layer 95 on the purchase pallet 90. A horizontally extending second conveyor 96 is arranged over the pallet 14. At least the horizontally extending second conveyor 96 is arranged to be vertically displaceable as indicated by arrow D. After arranging the base plate on the top layer 95 the horizontally extending second conveyor 96 is moved in the direction of arrow D until engaging the base plate. In this position the full purchase pallet 90 with items 92 is firmly hold between the horizontally extending first conveyor 94 and the horizontally extending second conveyor 96.

The horizontally extending first conveyor 94 and the horizontally extending second conveyor 96 are arranged in a tube shaped element 97 which is rotatable in a vertical plane as indicated with arrow R. When full purchase pallet 90 is firmly hold as described above the tube shaped element 97 is rotated 180° as indicated by arrow R to a position where the base plate 14 supports the full purchase pallet 90. The horizontally extending first conveyor 94 and the horizontally extending second conveyor 96 are then separated, for instance by lowering the horizontally extending second conveyor 96.

In this rotated position the original purchase pallet 90 resides on top of a bottom layer 98 and can be removed before further handling of the pallet 14 with items in transporting and storing in the storage lines. The control system 51, cf. FIG. 2, continuously updates content and positions of all pallets 14, goods 16 and individual items 92 in the storing lines 12. The control system 51 also keeps track of all pallets 14, purchase pallets 90, picking pallets 42 and ready pallets 44 in storing lines, and on elevators 26, input roller conveyors 27 and chain conveyors 29. The control system 51 further sends instructions to shuttles 22 and top shuttles 28 for handling pallets and goods. Such instructions include position of pallet, individual goods to be moved and position of delivery or rearranging or placing of goods.

Figure 7:
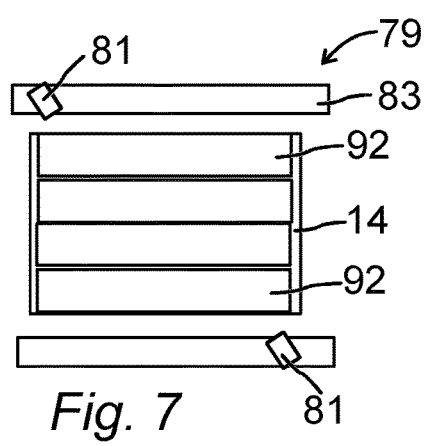
FIG. 7 is a schematic top view of an arrangement used for determining pattern of goods on a pallet.

The control system 51 stores information about the pattern formed by goods and individual items on pallets so as to ensure that lifting means of the top shuttle can locate and lift an item. Items 92 of a received purchase pallet turned over as described above are supported on a pallet 14 and transferred to a detecting arrangement 79 as shown in FIG. 7. Two image recorders 81 or cameras are mounted on opposite sides of the pallet 14 in a stand 83. The image recorders 81 are operatively connected to the control system 51 and transfer to the control system 51 images or enhanced information relating to the position, shape and extension of the items 92. Also information relating to individual height of items and total height of pallet with items is forwarded to the control system.

When a pallet 14 in a storage line 12 has been removed a shuttle 22 is instructed by the control system 51 to move another pallet 14 with goods 16 to the position of the removed pallet. If there are more pallets further down from the transport line 18 such pallets also are moved by the shuttle 22 closer to the transport line 18. Each time a pallet 14 is removed or moved the control system 51 updates the position of such pallets. Normally, rearranging of the storage lines 12 is performed during night hours or other time periods when other activities are less frequent.

While certain illustrative embodiments of the invention have been described in particularity, it will be understood that various other modifications will be readily apparent to those skilled in the art without departing from the invention. Accordingly, it is not intended that the scope of the claims appended hereto be limited to the description set forth herein but rather that the claims be construed as encompassing all equivalents of the present invention which are apparent to those skilled in the art to which the invention pertains.

The invention claimed is:

1. A multi-story goods storage arrangement comprising:
   a plurality of levels of storage lines arranged in parallel and transport lines extending between opposing ends of sets of said storage lines, wherein a transfer cart is operable along each transport line;
   a first shuttle supported on a rail system in a lower section of the transfer cart, said first shuttle is arranged to transport pallets with goods to and from selected positions along said storage lines by moving away from the transfer cart into said storage lines, supported by a corresponding rail system along said storage lines,
   a top shuttle suspending from a top rail arrangement of said transfer cart and moveable out from said transfer cart into a suspension rail arrangement in said storage lines; and
   a lift arranged on said top shuttle to lift goods from a pallet stored in said storage lines and to transport lifted goods to a pallet placed on the transfer cart.

2. A multi-story goods storage arrangement as claimed in claim 1, wherein said lift comprises a lifting yoke suspended from said top shuttle.

3. A multi-story goods storage arrangement as claimed in claim 2, wherein said lifting yoke is suspended in a plurality of hoisting belts winded on hoisting wheels.

4. A multi-story goods storage arrangement as claimed in claim 3, wherein said lifting yoke comprises a suction device for engaging and lifting goods.

5. A multi-story goods storage arrangement as claimed in claim 3, wherein said lifting yoke comprises a plurality of distributed suction devices for engaging and lifting goods.

6. A multi-story goods storage arrangement as claimed in claim 1, wherein said top shuttle is provided with a vision sensor directed downwards toward goods to be lifted.

7. A multi-story goods storage arrangement as claimed in claim 1, wherein said top shuttle is provided with sensor co-operating with markers distributed along said storage lines, and with a processor receiving data from said sensors and determining a present position based on said data received from said sensor.

8. A multi-story goods storage arrangement as claimed in claim 7, wherein said markers are formed as apertures in said horizontally extending suspension rail arrangement.

9. A multi-story goods storage arrangement as claimed in claim 7, wherein said processor is operatively connected to a control system for reporting position of said top shuttle and for receiving instructions for handling goods.

10. A multi-story goods storage arrangement as claimed in claim 1, further comprising a horizontally extending first conveyor and a horizontally extending second conveyor arranged in a tube shaped element rotatable in a vertical plane to receive and hold between them a pallet with goods received for storage in the multi-story goods storage arrangement, wherein said tube shaped element is arranged to turn said received pallet upside-down.

* * * * *